(12) United States Patent
Tang

(10) Patent No.: US 9,236,750 B2
(45) Date of Patent: Jan. 12, 2016

(54) INTELLIGENT ROBOT SYSTEM AND DOCKING METHOD FOR CHARGING SAME

(75) Inventor: Jinju Tang, Suzhou (CN)

(73) Assignee: Ecovacs Robotics (Suzhou) Co., Ltd., Suzhou (CN)

( * ) Notice: Subject to any disclaimer, the term of this patent is extended or adjusted under 35 U.S.C. 154(b) by 484 days.

(21) Appl. No.: 13/824,721

(22) PCT Filed: Aug. 30, 2011

(86) PCT No.: PCT/CN2011/079116
§ 371 (c)(1),
(2), (4) Date: May 7, 2013

(87) PCT Pub. No.: WO2012/034479
PCT Pub. Date: Mar. 22, 2012

(65) Prior Publication Data
US 2013/0221908 A1 Aug. 29, 2013

(30) Foreign Application Priority Data
Sep. 19, 2010 (CN) .......................... 2010 1 0290492

(51) Int. Cl.
*H02J 7/00* (2006.01)
*H02J 7/02* (2006.01)
*B25J 19/00* (2006.01)

(52) U.S. Cl.
CPC ............. *H02J 7/0042* (2013.01); *B25J 19/005* (2013.01); *H02J 7/0044* (2013.01)

(58) Field of Classification Search
CPC ...................................... H02J 7/0042
USPC ......................................... 320/107
See application file for complete search history.

(56) References Cited

U.S. PATENT DOCUMENTS 8,212,533 B2 * 7/2012 Ota .......................... B25J 5/007
320/109
8,390,251 B2 * 3/2013 Cohen et al. .......... A47L 9/2857
320/109

FOREIGN PATENT DOCUMENTS

| CN | 201195651 Y | 2/2009 |
|---|---|---|
| CN | 101375781 A | 3/2009 |
| JP | 2006239797 A | 9/2006 |
| TW | 200927540 A | 7/2009 |

OTHER PUBLICATIONS

International Search Report corresponding to International Patent Application Serial No. PCT/CN2011/079116; dated Sep. 30, 2011, 7 pages.

* cited by examiner

*Primary Examiner* — Edward Tso
*Assistant Examiner* — Ahmed Omar
(74) *Attorney, Agent, or Firm* — Nixon Peabody LLP

(57) ABSTRACT

An intelligent robot system comprising an intelligent robot (100) and a charging base (200). The intelligent robot (100) comprises a docking electrode (102), a walking mechanism (106) and a control unit (105). The docking electrode (102), the walking mechanism (106) and the control unit (105) are disposed in the body (101) of the intelligent robot (100). The charging base (200) comprises a charging electrode (201) disposed on the body (101) of the charging base (200). The intelligent robot (100) further comprises a gripping mechanism (107). When the docking electrode (102) and the charging electrode (201) dock successfully, the control unit (105) controls the e gripping mechanism (107) to lock the walking mechanism (106) to enable the intelligent robot (100) to maintain a successful docking state in the charging base (200), preventing the charging electrode (201) of the charging base (200) from being separated from the docking electrode (102) due to the improper movement of the walking mechanism (106). Any interference during of the intelligent robot (100) is thus prevented and charging efficiency is improved.

17 Claims, 8 Drawing Sheets

INTELLIGENT ROBOT SYSTEM AND DOCKING METHOD FOR CHARGING SAME

FIELD OF THE INVENTION

The present invention relates to the field of intelligent robot, in particular to intelligent robot system and docking method for charging same.

BACKGROUND OF THE PRIOR ART

With the leap-forward development of science and technology as the times progress, the intelligent devices such as robot have become well known to the people. Furthermore, being clean, convenient, timesaving and labor saving, some ground cleaning robots, such as intelligent sweeper equipment and intelligent mopping machine, have step in the family life of common people since they help the people get free from Tedious housework.

At present, the ground cleaning robots released on the existing market (such as intelligent sweeper equipment) are provided with built-in rechargeable battery, cleaning unit and dust box. The charging base used in combination with the intelligent sweeper equipment can provide electric power for the rechargeable battery. The intelligent sweeper equipment can be operated in cleaning mode and charging mode. In the cleaning mode, the intelligent sweeper equipment is energized by the rechargeable battery and makes treatment on the ground, and the impurities cleared out, such as particles are collected in the dust box. When the electric quantity of the rechargeable battery in the intelligent sweeper equipment is lower than the pre-set value, the intelligent sweeper equipment will automatically switch from cleaning mode to charging mode and return to the charging base for charging. A docking electrode provided on the body of the intelligent sweeper equipment is connected with the rechargeable battery; A charging electrode is provided on the body of the charging base; When the docking electrode of the intelligent sweeper equipment is docked with the charging electrode of charging base, the rechargeable battery is charged through the docking electrode. In the process when the intelligent sweeper equipment is moving towards the charging base so that the docking electrode will contact with the charging base, the control unit in the intelligent sweeper equipment continuously detect whether there is voltage or current on the docking electrode, so as to judge whether the charging electrode of charging base is successfully docked with the docking electrode of the intelligent sweeper equipment. If the control unit has detected voltage or current on the docking electrode, the intelligent sweeper equipment will stop the movement towards the charging base. The autonomous movement of the intelligent sweeper equipment is realized by driving the first motor to drive the walking mechanism, such as walking wheel; the forward or backward movement of the walking wheel is determined by the forward and reverse rotation of the first motor. Generally, the intelligent sweeper equipment can make passive movement, namely, the cleaner can also walk when it is not powered on. Therefore, when the first motor does not make driving control on the walking wheel, the walking wheel is under free state. Therefore, on this basis, there are following problems in the present docking method for charging. According to the present docking method for charging, once it is detected that there is voltage or current on the docking electrode of the cleaner, it is believed that the docking is successful, so that the first motor no longer drives the walking mechanism. However, since the walking wheel is under free state, it is quite likely that the walking wheel will still move forward or backward after the first motor has released the control over the walking wheel, so that the docking electrode of intelligent sweeper equipment is separated from the charging electrode of charging base, resulting in the power failure and/or charging failure of intelligent sweeper equipment in the process of charging.

SUMMARY OF THE INVENTION

With view of the deficiencies in the prior art, it is the technical objective of the present invention to provide an intelligent robot system and docking method for charging same, so that the intelligent robot can be reliably docked with the charging base and thus stably charged.

The technical objective of the present invention is realized through the following technical solution:

An intelligent robot system, encompassing an intelligent robot and a charging base; the intelligent robot encompasses a docking electrode, a walking mechanism and a control unit; the docking electrode, the walking mechanism and the control unit are set on the body of the intelligent robot; The charging base encompasses a charging electrode, the charging electrode set on the body of the charging base, the intelligent robot further encompasses a electrode docking locking actuator; when the docking electrode and the charging electrode dock successfully, the control unit controls the electrode docking locking actuator to lock the walking mechanism.

Wherein: The control unit encompasses a central processing unit, a detection unit and a walking control unit; when it has detected that the docking electrode has docked successfully, the detection unit sends a message to the central processing unit; after having received this message, the central processing unit sends locking control signal to the walking control unit.

According to need, the electrode docking locking actuator is designed as a braking device, wherein the braking device includes a tension rod, a swing rod and a deceleration pad; the tension rod is connected with the swing rod through the tension rod rotation axis, one end of the swing rod is fixed with the body of intelligent robot through the swing rod rotation axis, and another end of the swing rod is provided with the deceleration pad, and the deceleration pad approaches the walking mechanism;

The walking control unit corresponding to the braking device includes a second motor, a motor drive circuit and a transmission mechanism, wherein the signal end of the motor drive circuit receives the locking control signal sent from the central processing unit, and the driving end of the motor drive circuit is connected with the second motor, and the second motor is connected with the tension rod through the transmission mechanism.

Preferably, there are one or more braking devices.

In addition, the electrode docking locking actuator is a first motor provided with brake coil, and the walking control unit corresponding to the first motor includes a triode drive circuit and a triode control single circuit; the triode control single circuit includes a triode and a relay, wherein the relay includes a relay coil and a relay contact switch, the input end of the triode drive circuit is connected with the central processing unit and is designed to receive the locking control signal; the output end of the triode drive circuit is connected with the base electrode of the triode, the collector of the triode is connected with the relay coil, the relay contact switch is connected with the brake coil of the first motor; when the relay contact switch is closed, the brake coil is also closed.

The intelligent robot is a ground cleaning robot or an air cleaning robot or a security robot.

The present invention also provides a docking method for charging the intelligent robot system, encompassing the following steps in the charging mode:

Step 1: The intelligent robot approaches towards the charging base and is then docked with it according to the pilot signal sent by the charging base;

Step 2: The control unit of intelligent robot detects whether the intelligent robot has been successfully docked with the charging base, if failed, return to the step 1; if successful, execute the step 3;

Step 3: The control unit controls the electrode docking locking actuator of intelligent robot to act, then the electrode docking locking actuator locks the walking mechanism.

Preferably, after successful docking and before step 3, the control unit controls the walking mechanism to further move forwards by a preset distance.

Preferably, in step 2, by detecting whether there is voltage or current on the docking electrode on the body of intelligent robot, judge whether the intelligent robot is successfully docked with the charging base.

Wherein, in the step 3, the electrode docking locking actuator is a braking device, and the control unit controls the braking device to lock the walking mechanism.

In addition, in the step 3, the electrode docking locking actuator is a first motor provided with brake coil, the control unit is controlled through the brake coil to lock the walking mechanism broken by the first motor.

The beneficial effects of the present invention consist in that, when the intelligent robot has been successfully docked with the charging base, the electrode docking locking actuator controls the walking mechanism, so that the intelligent robot keeps the state of being successfully docked with the charging base, and the case where the docking electrode is separated from the charging electrode of the charging base due to the inappropriate movement of the walking mechanism can be avoided. As a result, the power failure and/or charging failure in the process of charging the intelligent robot can be effectively prevented, so that the intelligent robot can be stably and reliably charged.

The present invention is further described in detail with reference to the attached drawings and the embodiments.

DESCRIPTION OF ATTACHED DRAWINGS

DETAILED DESCRIPTION OF PREFERRED EMBODIMENTS

Figure 1:
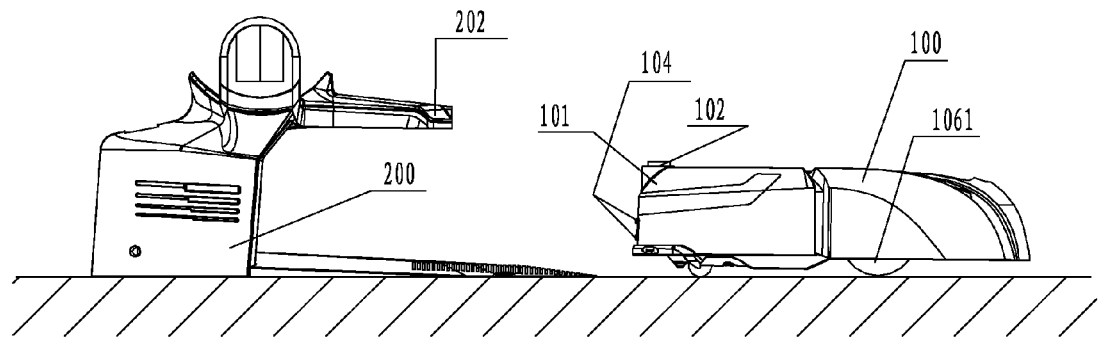
FIG. 1 is the structure diagram of the intelligent robot and the charging base in the intelligent robot system according to the embodiment of the present invention.
Figure 4:
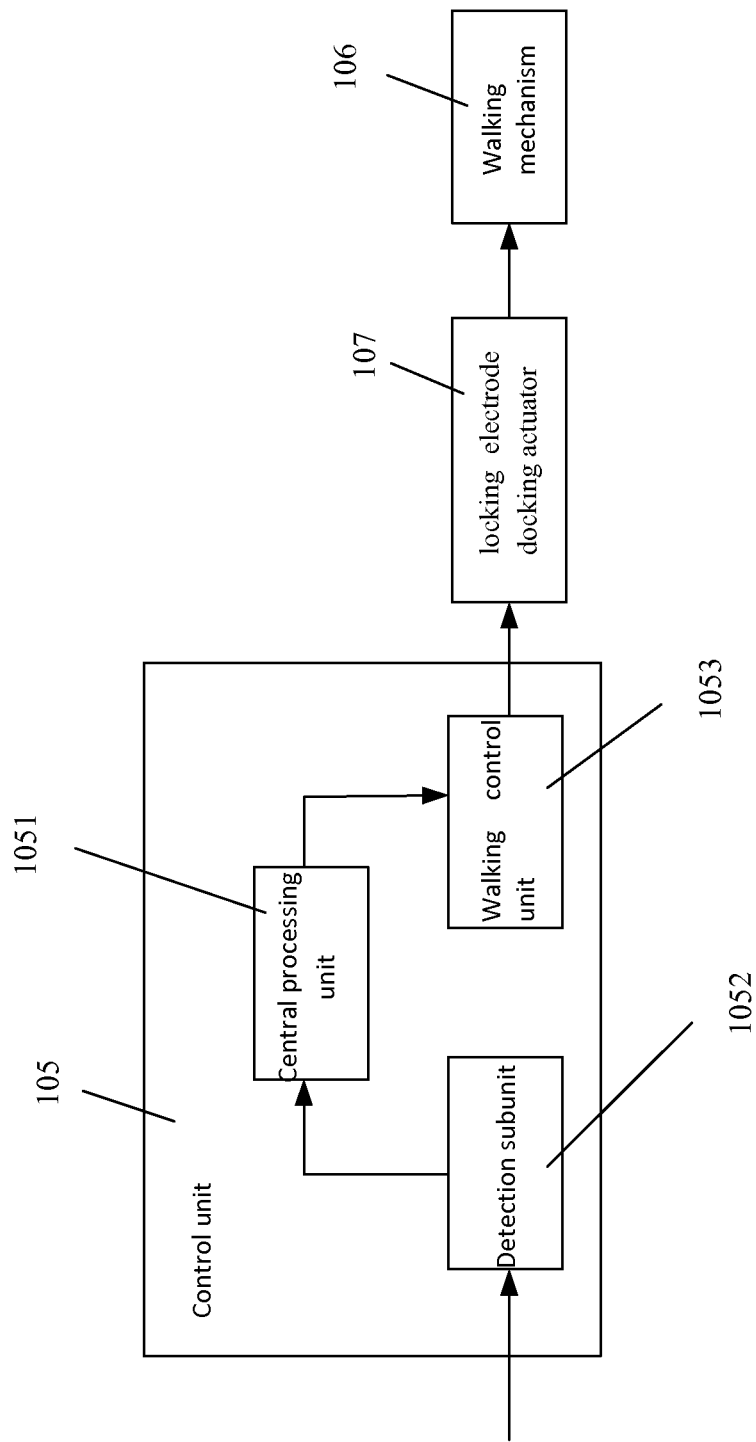
FIG. 4 is the functional block diagram for control of the intelligent robot according to the present invention.

FIG. 1 is the structure diagram of the intelligent robot and the charging base in the intelligent robot system in the embodiment according to the present invention; FIG. 4 is the functional block diagram for control of the intelligent robot according to the present invention;

As shown in FIG. 1 and FIG. 4, the intelligent robot system of the present invention encompasses an intelligent robot 100 and a charging base 200; the intelligent robot 100 includes a body 101; a control unit 105, an electrode docking locking actuator 107 and a walking mechanism 106 are provided in the body 101, wherein the control unit 105 includes a central processing unit 1051, a detection unit 1052 and a walking control unit 1053; the walking mechanism 106 consists of two walking wheels 1061 located on both sides of the body 101; the walking control unit 1053 outputs control signal to the electrode docking locking actuator 107, and the electrode docking locking actuator 107 implements locking control on the walking wheels 1061.

In addition, the walking mechanism 106 can also consist of the other walking components except for the walking wheels 1061.

Figure 2:
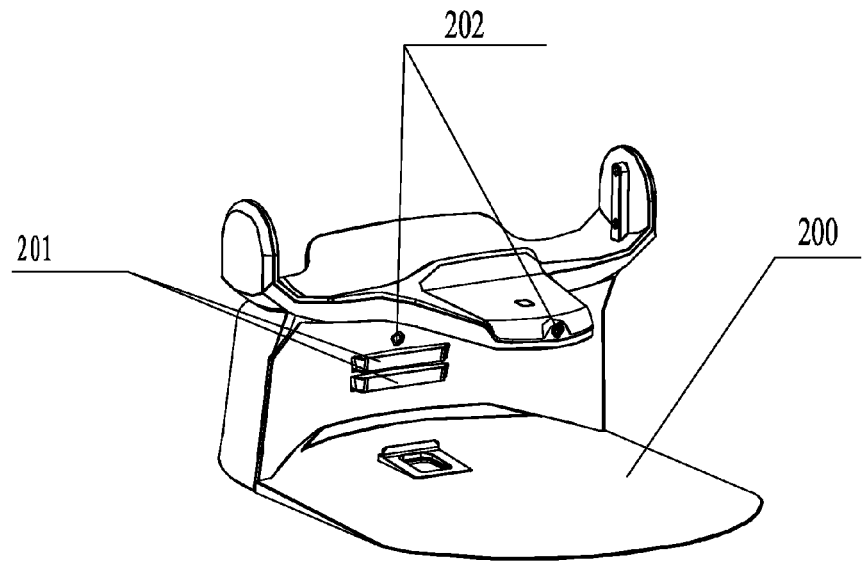
FIG. 2 is the structural diagram of the charging base in the intelligent robot system according to the present invention.

FIG. 2 is the structural diagram of the charging base for the intelligent robot system according to the present invention; As shown in FIG. 1 and FIG. 2, a docking electrode 104 is provided at the front end of the intelligent robot 100; the docking electrodes 104 comprise a positive electrode and a negative electrode, which are set in bilateral symmetry in relation to the center line of the intelligent robot 100. In addition, the intelligent robot 100 also includes a signal receiving unit 102, which is located at the front end of the intelligent robot 100 and is used to receive the signals sent from the charging base 200. Charging electrodes 201 are provided on the upright portion of the charging base 200. The charging electrodes 201 comprise a positive electrode and a negative electrode, which are set in bilateral symmetry in relation to the center line of the charging base body 200. In addition, a signal emission unit is set on the charging base 200 and is used to transmit the pilot signals to lead the intelligent robot to approach the charging base 200.

The intelligent robot 100 has two modes, namely operating mode and charging mode. When the intelligent robot 100 is in the operating mode under the control of the control unit 105, the walking wheels 1061 drive the intelligent robot 100 to move and make the corresponding operation; If the intelligent robot is a cleaning robot, such as sweeper and vacuum cleaner, it makes cleaning operation and treatment on the working surface; If it is an air cleaner, the robot makes the air cleaning operation; If it is a security robot, the robot makes the corresponding security operation. When the electric quantity of the intelligent robot 100 is lower than the pre-set value, the intelligent robot 100 will automatically switch from operating mode to charging mode under the action of the control unit 105. At this moment, the signal receiving unit 102 of the intelligent robot 100 receives the pilot signal sent from the signal emission unit 202 of the charging base; under the guidance of the pilot signal, the control unit 105 drives the first motor used to control the walking wheels 1061; the first motor drives the walking wheels 1061, so that the intelligent robot 100 moves towards the charging base 200; When the docking electrode 104 of the intelligent robot 100 is accurately docked with the charging electrode 201 of the charging base 200, the intelligent robot 100 is charged by the charging base 200.

Figure 3:
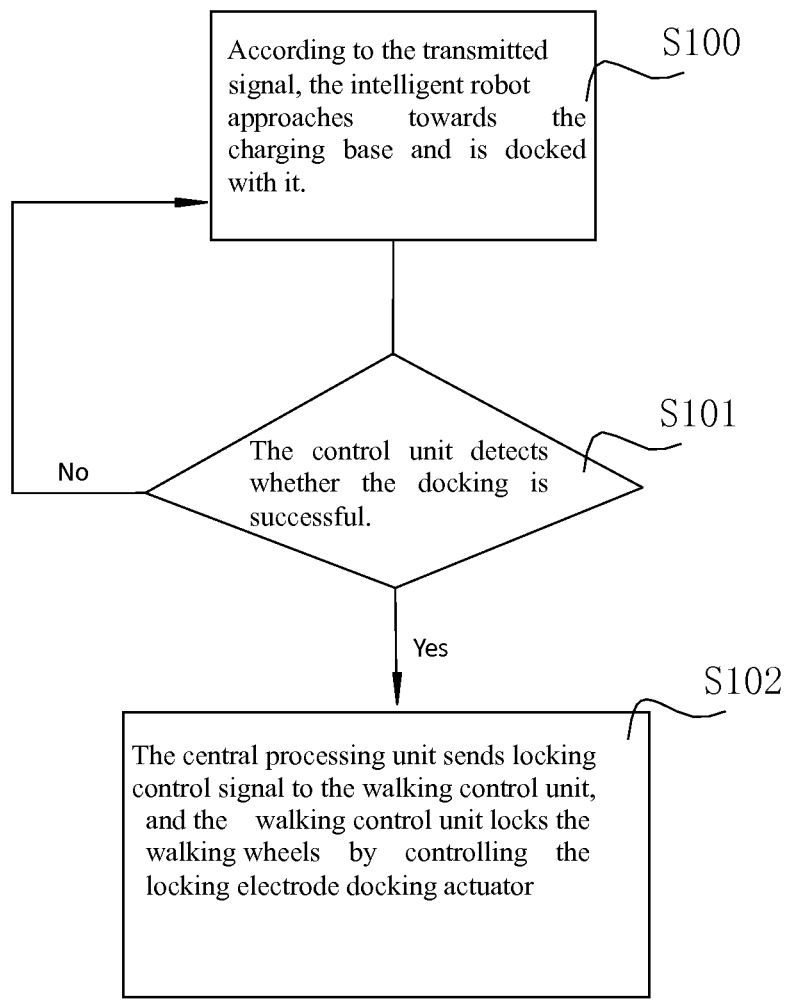
FIG. 3 is the flow chart for the docking method for charging the intelligent robot through the charging base according to the present invention.

FIG. 3 is the flow chart for the docking method for charging the intelligent robot through the charging base according to the present invention: As shown in FIG. 3 and FIG. 4, after having received the pilot signal sent by the signal emission unit 202 of the charging base 200, the signal receiving unit 102 of the intelligent robot 100 approaches towards the charging base 200 and is docked with it (Step S100); the detection unit 1052 in the control unit 105 detects whether there is voltage on the docking electrode 104; If there is voltage on the docking electrode 104, it is proved that the docking has been successful, and the system proceeds to the step S102; If no voltage is detected on the docking electrode 104, the system proceeds to the step S100 (step S101); The central processing unit 1051 sends locking control signal to the walking control unit 1053, the walking control unit 1053 realizes the locking of walking wheels 1061 by controlling the electrode docking locking actuator 107, so that the intelligent robot 100 stops walking and stays in same place (Step S102).

In addition, by detecting whether there is current on the docking electrode 104, the detection unit 1052 can also judge whether the charging electrode 201 is successfully docked with the docking electrode 104.

In addition, when the detection unit 1052 has detected any voltage on the docking electrode 104, the walking control unit 1053 in the control unit 105 drives the first motor used to control the walking wheels 1061, the first motor drives the walking wheels 1061 to walk on, so that the intelligent robot 100 moves towards the charging base 200 for a pre-set distance, thus the docking electrode 104 contacts with the charging electrode 201 more tightly and effectively. At this moment, the walking control unit 1053 conducts locking control on the walking wheels 1061 by the electrode docking locking actuator 107, so that the intelligent robot 100 stops walking and stays in same place.

Embodiment 1

Figure 5:
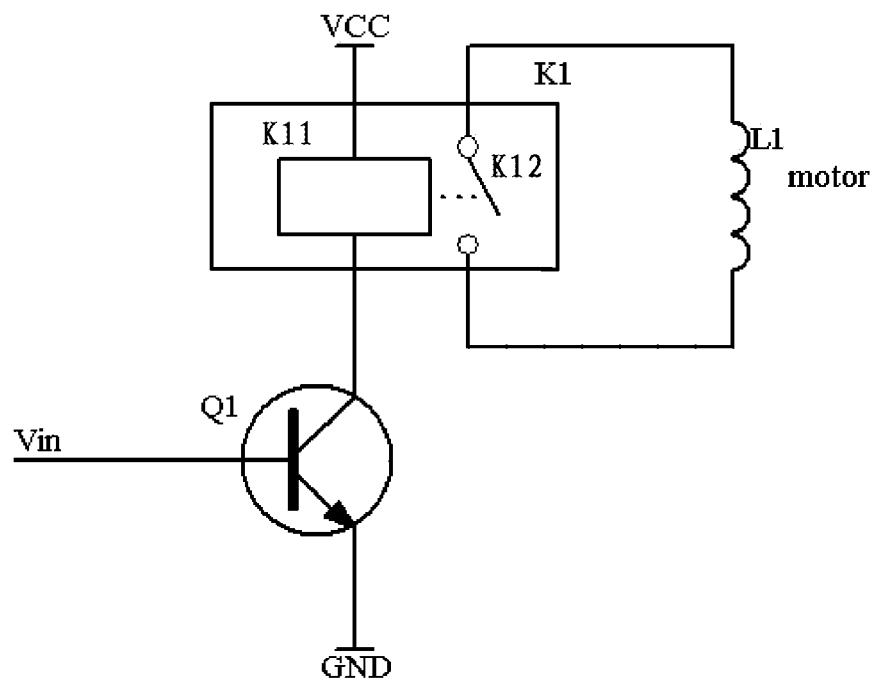
FIG. 5 is the schematic diagram for the triode control circuit of the walking control unit in the embodiment 1 according to the present invention.
Figure 6:
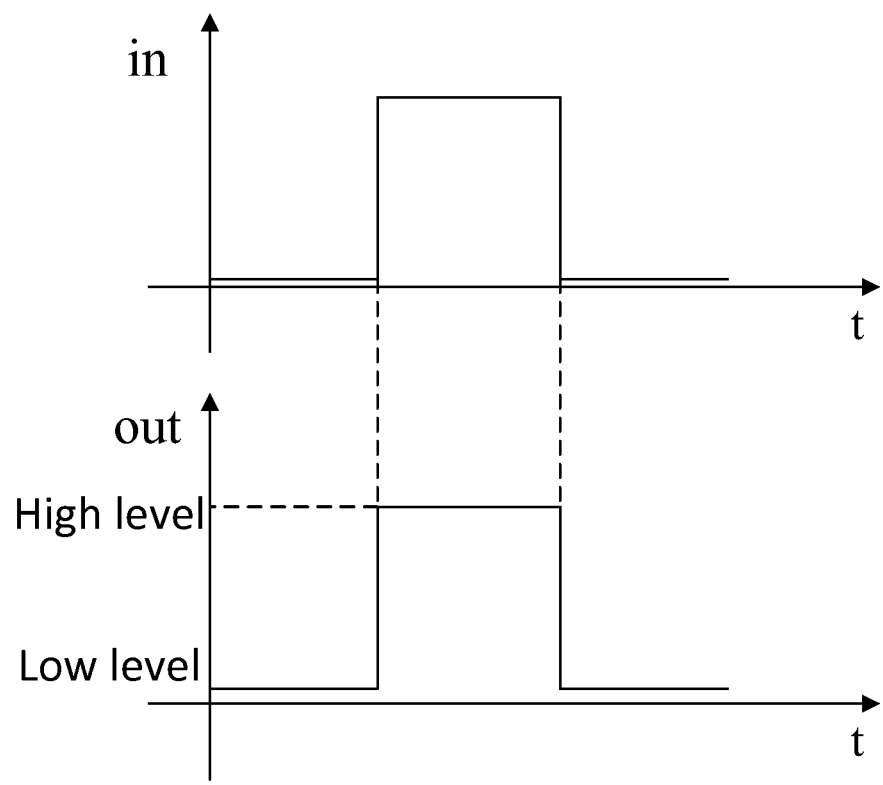
FIG. 6 is the schematic diagram showing the relation between the input and output signals of the triode drive circuit in the embodiment 1 according to the present invention.
Figure 7:
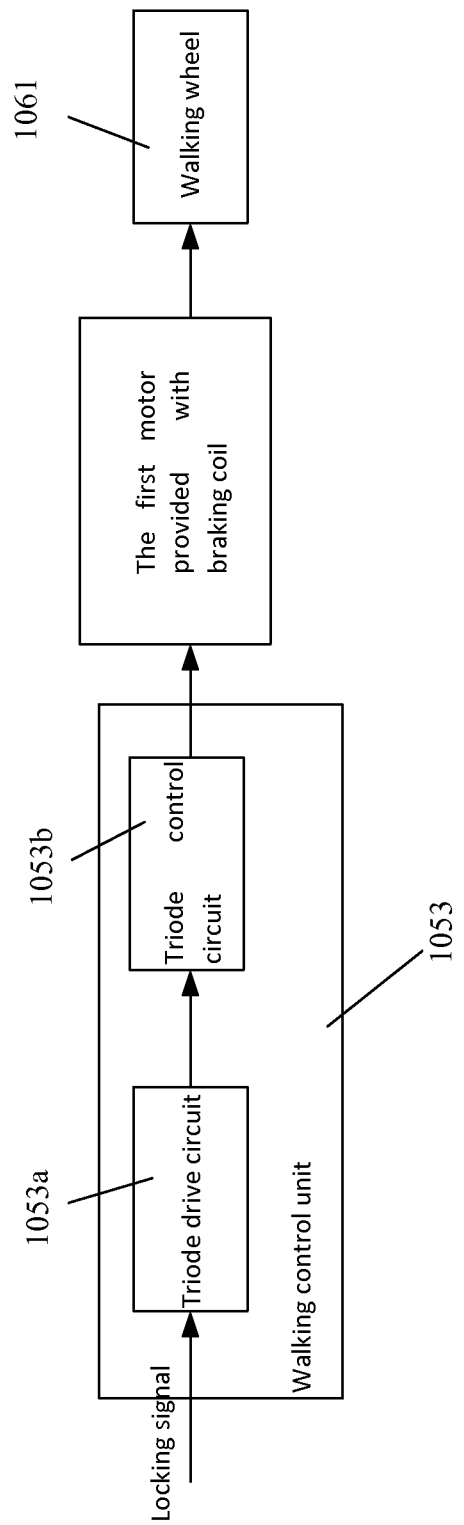
FIG. 7 is the operating principle block diagram for the walking control unit in the embodiment 1 according to the present invention.

In a specific embodiment of the present invention, the electrode docking locking actuator 107 is a first motor provided with brake coil. FIG. 7 is the operating principle block diagram for the walking control unit in the embodiment 1 according to the present invention; As shown in FIG. 7, the walking control unit 1053 includes a triode drive circuit 1053a and a triode control circuit 1053b. FIG. 5 is the schematic diagram for the triode control circuit of the walking control unit in the embodiment 1 according to the present invention; FIG. 6 is the schematic diagram showing the relation between the input and output signals of the triode drive circuit in the embodiment 1 according to the present invention; As shown in FIG. 5 in combination with FIG. 7, the triode control single-circuit 1053b includes a triode Q1 and a relay K1, wherein the relay K1 includes a relay coil K11 and a relay contact switch K12. The output signal of the triode drive circuit 1053a is used as the base electrode drive signal for the triode Q1. As shown in FIG. 5 and FIG. 6, the base electrode of the triode Q1 is connected with the output end of the triode drive circuit 1053a, the collector of the triode Q1 is connected with the relay coil K11; two terminals of the relay contact switch K12 are connected with two terminals of the brake coil L1 in the first motor provided with brake coil; The emitter of the triode Q1 is grounded. When the input end of the triode drive circuit 1053a has received the locking signal, it outputs a high level to the output end of the triode drive circuit 1053a, this high level is used as the drive signal for the triode, so that the triode Q1 is turned on, the relay coil K11 is switched on with the power supply, the relay coil K11 is charged, the relay contact switch K12 is closed, and thus the brake coil L1 is closed. Since the rotating motor rotor generates a rotating magnetic field prior to being closed, and the brake coil L1 is in this rotating magnetic field, the brake coil L1 generates a great induced current when the brake coil L1 is closed, and this induced current generates a braking force on this motor rotor in the direction being opposite to the original rotation direction of the rotor, so that the first motor instantaneously stops running and falls in locked state. Under this influence, the walking wheels 1061 driven by the first motor are also fall in the locked state at this moment.

The present invention is further described in detail. As shown in FIGS. 1-7, when the intelligent robot is docked with the electrode for charging and the detection unit 1052 of the intelligent robot 100 detects that there is voltage or current on the docking electrode 101, the central processing unit 1051 sends locking control signal to the triode drive circuit 1053a; When the triode drive circuit 1053a has received this signal, it sends high-level signal to the base electrode of the triode Q1 in the triode control circuit 1053b, so that the triode Q1 is turned on, the relay coil K11 is charged by the power supply, the relay contact switch K12 is closed, the brake coil L1 is closed and short-circuited, the first motor is locked and thus fails to drive the walking wheels 1061 to rotate freely. When the intelligent robot 100 is completely charged and thus is required to leave the charging base 200, the central processing unit 1051 sends an unlocking signal to the triode drive circuit 1053a, the triode drive circuit 1053a outputs a low level, the triode Q1 in the triode control circuit 1053b is cut off, so that the relay coil K11 is disconnected from the power supply, the relay contact switch K12 is disconnected, thus the brake coil L1 is disconnected and releases the braking force applied on the first motor, and the first motor can drive the walking wheels 1061 to rotate freely.

Embodiment 2

Figure 8A:
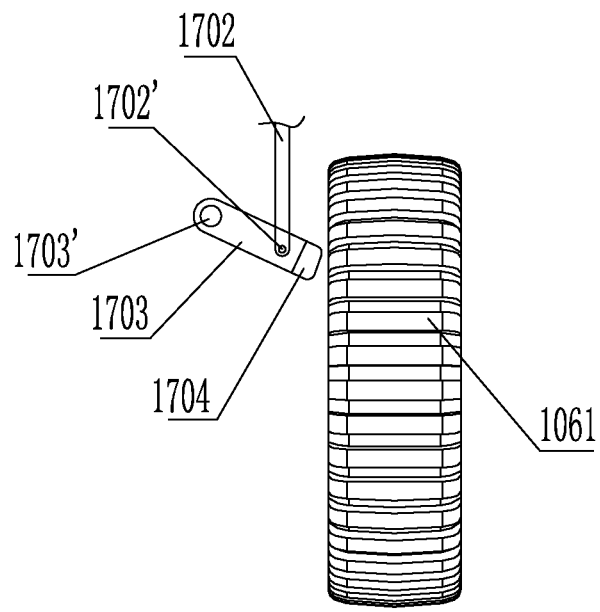
FIGS. 8A-8D are the structural diagrams for the braking device in the embodiment 2 according to the present invention.

FIGS. 8A-8D are the structural diagrams for the braking device in the embodiment 2 according to the present invention; FIG. 9 is the operating principle block diagram for the embodiment 2 according to the present invention. As shown in FIG. 8A and FIG. 9, the walking control unit 1053 encompasses a second motor 1053d as well as its drive circuit 1053c and transmission mechanism 1053e, wherein the second motor 1053d is a motor newly added on the basis of the first motor carried on the intelligent robot 100, in order to control the braking device. By means of gears and racks, the tension rod 1702 is used to connect the transmission mechanism 1053e (which is designed to change the rotary movement of motor into linear movement) with the second motor 1053d, and thus is controlled by the second motor 1053d. A punch hole is provided on one end of the tension rod 1702, the tension rod rotation axis 1702' passes through the punch hole of the tension rod 1702 and is connected and fixed with the swing rod 1703. A punch hole is provided on one end of the swing rod 1703, the swing rod rotation axis 1703' passes through the punch hole of the swing rod 1703 and is connected and fixed with the body 101 of the intelligent robot 100; A deceleration pad 1704 is provided on the another end of the swing rod 1703, wherein when the deceleration pad 1704 approaches the walking wheels 1061, the walking wheels 1061 will stop due to friction force, so that the intelligent robot 100 stops and stays in same place.

Figure 8B:
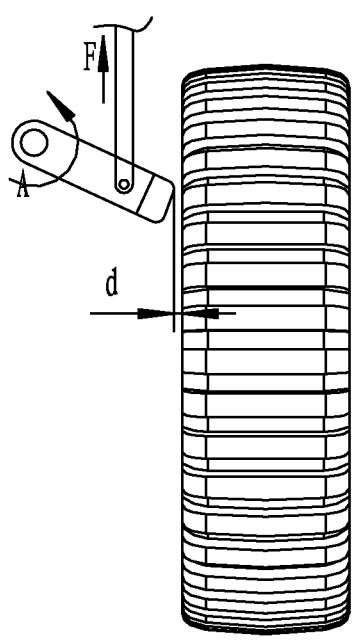
Figure 8C:
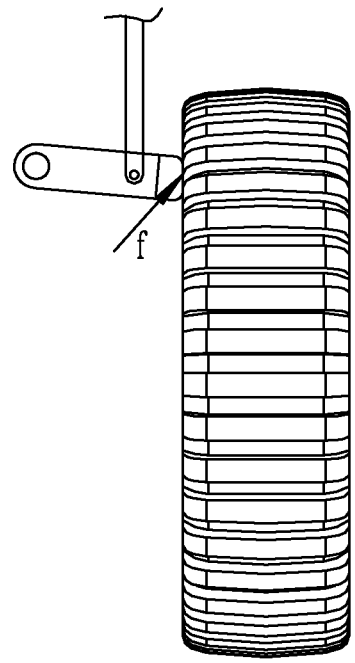
Figure 9:
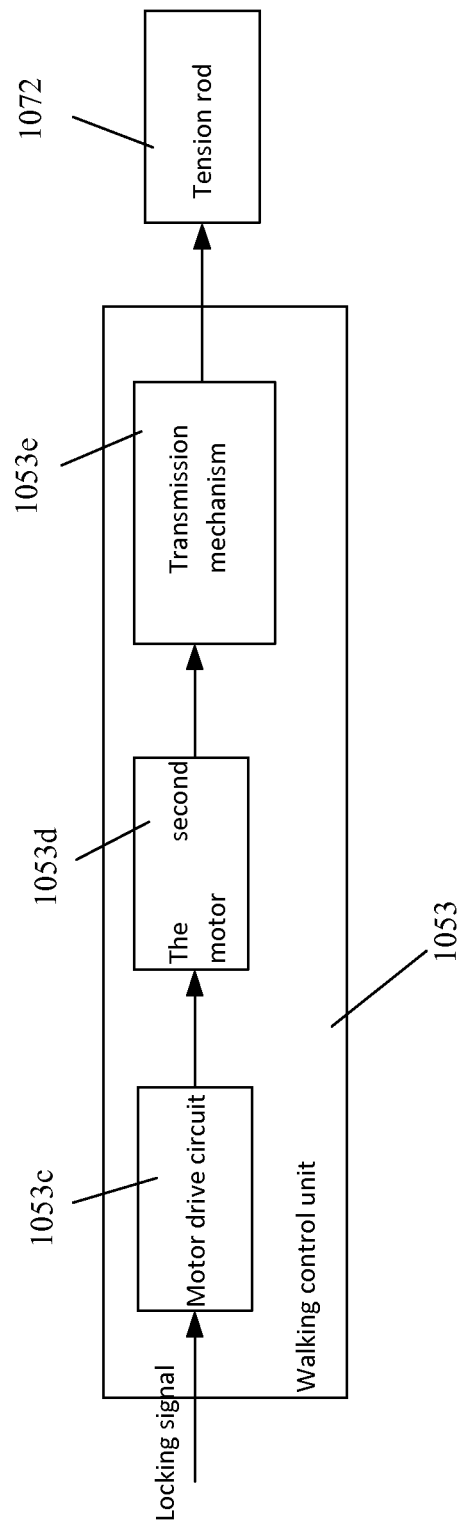
FIG. 9 is the operating principle block diagram for the walking control unit in the embodiment 2 according to the present invention.

As shown in FIG. 8B and FIG. 8C, a clearance d is provided between the deceleration pad 1704 and the walking wheels 1601; when the docking electrode 104 has been successfully docked with the charging electrode 201, the motor drive circuit 1053c in the walking control unit 1053 receives the locking signal sent from the central processing unit 1051 and controls the second motor 1053d to apply a upward tension F on the tension rod 1702 through the transmission mechanism 1053e; the swing rod 1703 swings in A direction with the swing rod rotation axis 1703' as the center, the deceleration pad 1704 gradually approaches the walking wheels 1601. When the deceleration pad 1704 has come into contact with the walking wheels 1601, the walking wheels 1601 stop and stay in same place due to friction force. When the charging process is completed and the intelligent robot 100 is required to leave the charging base, the motor drive circuit 1053c in the walking control unit 1053 receives the unlocking signal sent from the central processing unit 1051 and controls the second motor 1053d to release the upward tension F applied on the tension rod 1702 through the transmission mechanism 1053e, so that the deceleration pad 1704 leaves the walking wheels 1601, and the walking wheels 1601 can rotate freely since they have been out of the control from the friction force.

In said embodiment, the motor drive circuit 1053c may adopt the drive circuits or driving components which are adapted to the type and technical indexes of the motor in the prior tart. Since the structures of these drive circuits or driving components are well known by those skilled in the art, no further detail is provided herein.

Figure 8D:
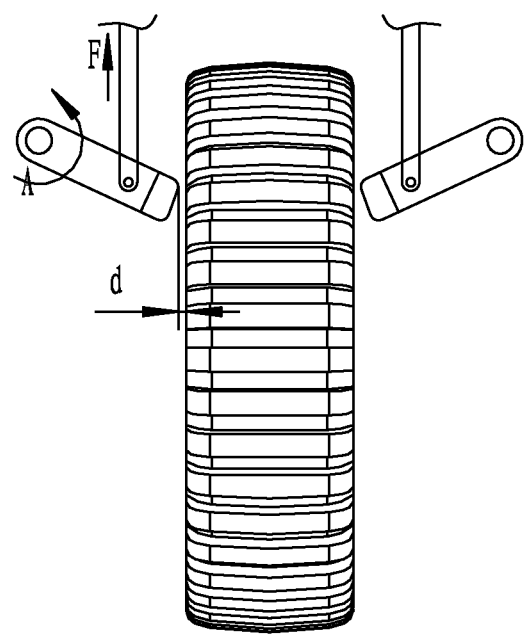

In addition, also as shown in FIG. 8D, a braking device is respectively provided on both sides of the walking wheels. Since its braking principle is same as that of the embodiment 2, unnecessary details will not be given herein.

To sum up, as compared with the prior art, the intelligent robot system provided by the present invention can significantly improve the success rate of docking between the intelligent robot system and the charging base, and thus can be charged stably and reliably.

The intelligent robot in said embodiment can be any rechargeable robot which is designed to move freely, such as a ground cleaning robot, an air cleaning robot or a security robot.

The invention claimed is:

1. An intelligent robot system, encompassing an intelligent robot (100) and a charging base (200); the intelligent robot (100) encompasses a docking electrode (102), a walking mechanism (106) and a control unit (105); the docking electrode (102), the walking mechanism (106) and the control unit (105) are set on the body (101) of the intelligent robot (100); The charging base (200) encompasses a charging electrode (201), the charging electrode (201) set on the body of the charging base (200), characterized in that, the intelligent robot (100) further encompasses a electrode docking locking actuator (107); when the docking electrode (102) and the charging electrode (201) dock successfully, the control unit (105) controls the electrode docking locking actuator (107) to lock the walking mechanism (106).

2. The intelligent robot system of claim 1, characterized in that, the control unit (105) encompasses a central processing unit (1051), a detection unit (1052) and a walking control unit (1053); when it has detected that the docking electrode (102) has docked successfully, the detection unit (1052) sends a message to the central processing unit (1051); after having received this message, the central processing unit (1051) sends locking control signal to the walking control unit (1053).

3. The intelligent robot system of claim 2, characterized in that, the electrode docking locking actuator (107) is a braking device, wherein the braking device includes a tension rod (1702), a swing rod (1703) and a deceleration pad (1704); the tension rod (1702) is connected with the swing rod (1703) through the tension rod rotation axis (1702'), one end of the swing rod (1703) is fixed with the body (101) of the intelligent robot (100) through the swing rod rotation axis (1703'), and another end of the swing rod (1703) is provided with the deceleration pad (1704), and the deceleration pad (1704) approaches the walking mechanism (106);

the walking control unit (1053) includes a second motor (1053d), a motor drive circuit (1053c) and a transmission mechanism (1053e), wherein the signal end of the motor drive circuit (1053c) receives the locking control signal sent from the central processing unit (1051), and the driving end of the motor drive circuit (1053c) is connected with the second motor (1053d), and the second motor (1053d) is connected with the tension rod (1702) through the transmission mechanism (1053e);
wherein there is one or more braking devices.

4. The intelligent robot system of claim 2, characterized in that, the electrode docking locking actuator (107) is a first motor provided with brake coil (L1);

the walking control unit (1053) includes a triode drive circuit (1053a) and a triode control single circuit (1053b); the triode control single circuit (1053b) includes a triode (Q1) and a relay (K1), wherein the relay (K1) includes a relay coil (K11) and a relay contact switch (K12), the input end of the triode drive circuit (1053a) is connected with the central processing unit (1051) and is designed to receive the locking control signal; the output end of the triode drive circuit (1053a) is connected with the base electrode of the triode (Q1), the collector of the triode (Q1) is connected with the relay coil (K11), the relay contact switch (K12) is connected with the brake coil (L1) of the first motor; when the relay contact switch (K12) is closed, the brake coil (L1) is also closed.

5. The intelligent robot system of claim 1, characterized in that, the intelligent robot is a ground cleaning robot or an air cleaning robot or a security robot.

6. A docking method for charging an intelligent robot, wherein in a charging mode, the docking method encompasses the following steps:

Step 1: the intelligent robot (100) approaches towards a charging base (200) and is then docked with it according to a pilot signal sent by the charging base (200);

Step 2: a control unit (105) of the intelligent robot (100) detects whether the intelligent robot (100) has been successfully docked with the charging base (200), if failed, return to the step 1; if successful, execute the step 3;

Step 3: the control unit (105) controls an electrode docking locking actuator (107) of the intelligent robot (100) to operate, then the electrode docking locking actuator (107) locks a walking mechanism (106) of the intelligent robot (100).

7. The docking method for charging the intelligent robot of claim 6, characterized in that, after successful docking and before step 3, the control unit (105) controls the walking mechanism (106) to further move forwards by a preset distance.

8. The docking method for charging the intelligent robot of claim 6, characterized in that, in step 2, by detecting whether there is voltage or current on a docking electrode (104) on a body of intelligent robot (100), judge whether the intelligent robot (100) is successfully docked with the charging base (200).

9. The docking method for charging the intelligent robot of claim 6, characterized in that, in the step 3, the electrode docking locking actuator (107) is a braking device, and the control unit (105) controls the braking device to lock the walking mechanism (106).

10. The docking method for charging the intelligent robot of claim 6, characterized in that, in the step 3, the electrode docking locking actuator (107) comprises a first motor provided with brake coil, the control unit (105) is designed to make the first motor to brake by controlling the brake coil (L1) and in turn lock the walking mechanism (106) driven by the first motor.

11. The docking method for charging the intelligent robot of claim 7, wherein step 2 comprises detecting whether there is voltage or current on a docking electrode (104) on a body of the intelligent robot (100) to determine whether the intelligent robot (100) is successfully docked with the charging base (200).

12. The docking method for charging the intelligent robot of claim 7, wherein, in step 3, the electrode docking locking actuator (107) is a braking device, and the control unit (105) controls the braking device to lock the walking mechanism (106).

13. The docking method for charging the intelligent robot of claim 7, wherein, in step 3, the electrode docking locking actuator (107) is a first motor provided with brake coil, the control unit (105) is designed to make the first motor to brake by controlling the brake coil (L1) and in turn lock the walking mechanism (106).

14. A docking method for charging an intelligent robot, comprising the sequential acts of:
    emitting a pilot signal from a charging base (200) to an intelligent robot (100) to guide the intelligent robot to the charging base (200), the intelligent robot (100) comprising a docking electrode (102), a walking mechanism (106), a control unit (105), and an electrode docking locking actuator (107), the control unit being configured to control the electrode docking locking actuator (107) to lock the walking mechanism (106) when the docking electrode (102) is successfully docked with a charging electrode (201) of the charging base (200)
    docking the intelligent robot (100) to the charging base (200);
    determining whether the intelligent robot (100) is successfully docked with the charging base (200) using the control unit (105);
    if the control unit (105) determines that the intelligent robot (100) is not successfully docked with the charging base (200), repeat the acts of emitting, docking, and determining; and
    if the control unit (105) determines that the intelligent robot (100) is successfully docked with the charging base (200), the control unit (105) causes the electrode docking locking actuator (107) to lock the walking mechanism (106).

15. The docking method for charging the intelligent robot of claim 14, wherein the act of determining further comprises detecting whether there is voltage or current on a docking electrode (104) of the intelligent robot (100).

16. The docking method for charging the intelligent robot of claim 14, wherein the electrode docking locking actuator (107) is a braking device.

17. The docking method for charging the intelligent robot of claim 14,
    wherein the electrode docking locking actuator (107) comprises a first motor and a brake coil (L1), and
    wherein the control unit (105) is configured to control the first motor to cause the brake coil (L1) to generate a braking force to lock the first motor to thereby lock the walking mechanism (106).

* * * * *